United States Patent [19]

Levesque et al.

[11] 4,355,654

[45] Oct. 26, 1982

[54] FLUID FLOW CONTROL DEVICE FOR MONITORING THE FLUID FLOW IN A CONDUIT FOR LEAKAGE OF FLUID

[75] Inventors: Paul N. Levesque, Bristol; Neal M. Lavado, Watertown, both of Conn.

[73] Assignee: Midland-Ross Corporation, Cleveland, Ohio

[21] Appl. No.: 238,497

[22] Filed: Feb. 26, 1981

[51] Int. Cl.³ .......................... G01M 3/28; G05D 7/06
[52] U.S. Cl. ................................ 137/110; 73/40.5 R; 137/460; 137/486
[58] Field of Search ...................... 73/40.5 R; 137/110, 137/460, 486; 340/605

[56] References Cited

U.S. PATENT DOCUMENTS

| 1,803,437 | 5/1931 | Riney | 137/110 |
| 2,589,371 | 3/1952 | Griffin | 137/110 |
| 3,664,357 | 5/1972 | Kreiss | 137/486 X |

FOREIGN PATENT DOCUMENTS

241866 9/1969 U.S.S.R. .......................... 73/40.5 R

Primary Examiner—Robert G. Nilson
Attorney, Agent, or Firm—Harlan E. Hummer

[57] ABSTRACT

A device for monitoring the flow of fluid in a pair of conduits and blocking the flow of fluid in a conduit when leakage of fluid is sensed therein. The device is provided with, a pair of inlet and outlet passageways in which fluid flows to and from the conduits, a pair of solenoid operated shutoff valves for blocking the flow of fluid in the inlet passageways and a pair of check valves for blocking the backflow of fluid through the outlet passageways. Means are supplied for (a) sensing the flow of fluid through the passageways and translating the same into an electrical signal for comparison with a norm, and (b) actuating the closing of a shutoff valve to block the flow of fluid into a conduit which is connected between an inlet and outlet passageway in which the electrical signal, corresponding to the flow of fluid therein, differs from the norm, the means being designed to delay actuation of the shutoff valve until it is determined that the change in signal from the norm is the result of actual leakage of fluid from the conduit.

13 Claims, 10 Drawing Figures

FLUID FLOW CONTROL DEVICE FOR MONITORING THE FLUID FLOW IN A CONDUIT FOR LEAKAGE OF FLUID

BACKGROUND OF THE INVENTION

The invention relates to fluid flow monitoring devices and is especially useful in aircraft where, because of space limitations, it is desirable to provide a single device to monitor, for leakage, fluid flow in more than one conduit. Such devices, presently on the market, are designed to check the flow of fluid in a plurality of different conduits by means of comparing pressure differentials of fluid passing through the device into the conduits with those of fluid returning to the device from the conduits. However, these devices react to false leakage signals produced during temporary situations caused by, for example, air entrapment in the fluid, unusual gravitational loads during sharp maneuvering of the aircraft, rapid temperature changes, and pressure fluctuations caused during startup and shutdown of the pumps used in circulating fluid through the devices and conduits to various parts of the aircraft. Another problem is that, in certain instances, these devices react to block the flow of fluid in all of the conduits to create an even more hazardous problem than leakage. The invention is in an improved fluid flow control device which is designed to overcome the aforementioned problems while providing a more desirable reaction where fluid is allowed to flow in some of the conduits when other conduits are blocked because of leakage.

Briefly stated, the invention is in a fluid flow control device, for monitoring the flow of fluid in at least one pair of conduits and terminating the flow of fluid in at least one of the conduits when leakage of fluid occurs therein. The device comprises a fluid inlet to which is attached tubing for carrying fluid, under pressure, to the device from a remote source of supply. A pair of inlet passageways are provided for dividing the flow of fluid in the device into two branches for subsequent passage into a pair of conduits which the device observes for leakage, the inlet passageways terminating at a pair of fluid discharge ports to which the conduits are coupled. Opposing ends of the conduits are secured to a pair of re-entry ports through which fluid returns to the device. A pair of outlet passageways lead from the re-entry ports and terminate at a single fluid outlet to which is coupled tubing for returning fluid, under pressure, from the device to the source of supply for reconditioning and subsequent recirculation to the device and fluid conduits. A solenoid operated shutoff valve is in each of the inlet passageways for blocking or terminating the flow of fluid through a passageway and attached conduit when leakage of fluid is sensed in the conduit. A check valve is in each of the outlet passageways for preventing the backflow of fluid into the conduit in which leakage is sensed. Each of the inlet and outlet passageways are provided with a calibrated orifice in the form of a venturi section, whereby a fluid pressure differential is created between fluid entering and leaving the orifices. Means are provided for sensing these fluid pressure differentials and translating them into electrical signals. Means are supplied for monitoring these electrical signals and actuating operation of a timer when there is a variance in the electrical signals. Thus, the device does not immediately react to terminate the flow of fluid, but waits for a period of time sufficient for any of the aforementioned temporary situations to pass. If there is still a variance in the electrical signals after the period of time has lapsed, then the device will operate the solenoid and shutoff valve necessary to block the flow of fluid into the conduit in which leakage is sensed.

The device is designed to block only one of a pair of conduits serviced by the device, even though leakage is sensed in both conduits. Thus, there will not be a complete shutdown of the system. Generally, the conduit in which leakage is first sensed is blocked. However, in cases where the device simultaneously detects minor leakage in one conduit and major leakage in another, the device will act to block the conduit in which the most serious leak is sensed, simply because the device responds more quickly to a greater loss of fluid pressure in the conduits. This safety feature of the device prevents a more hazardous situation than leakage from developing.

DESCRIPTION OF THE DRAWING

The following description of the invention will be better understood by having reference to the accompanying drawing, wherein.

DETAILED DESCRIPTION OF THE PRIOR ART MECHANISM

Figure 1:
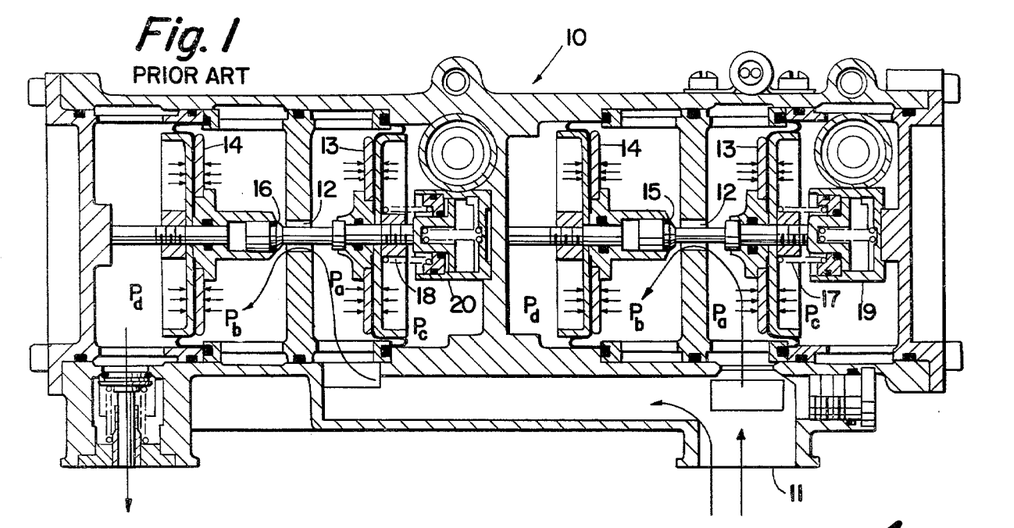
FIG. 1 is a section of a prior art fluid flow control mechanism.
Figure 2:
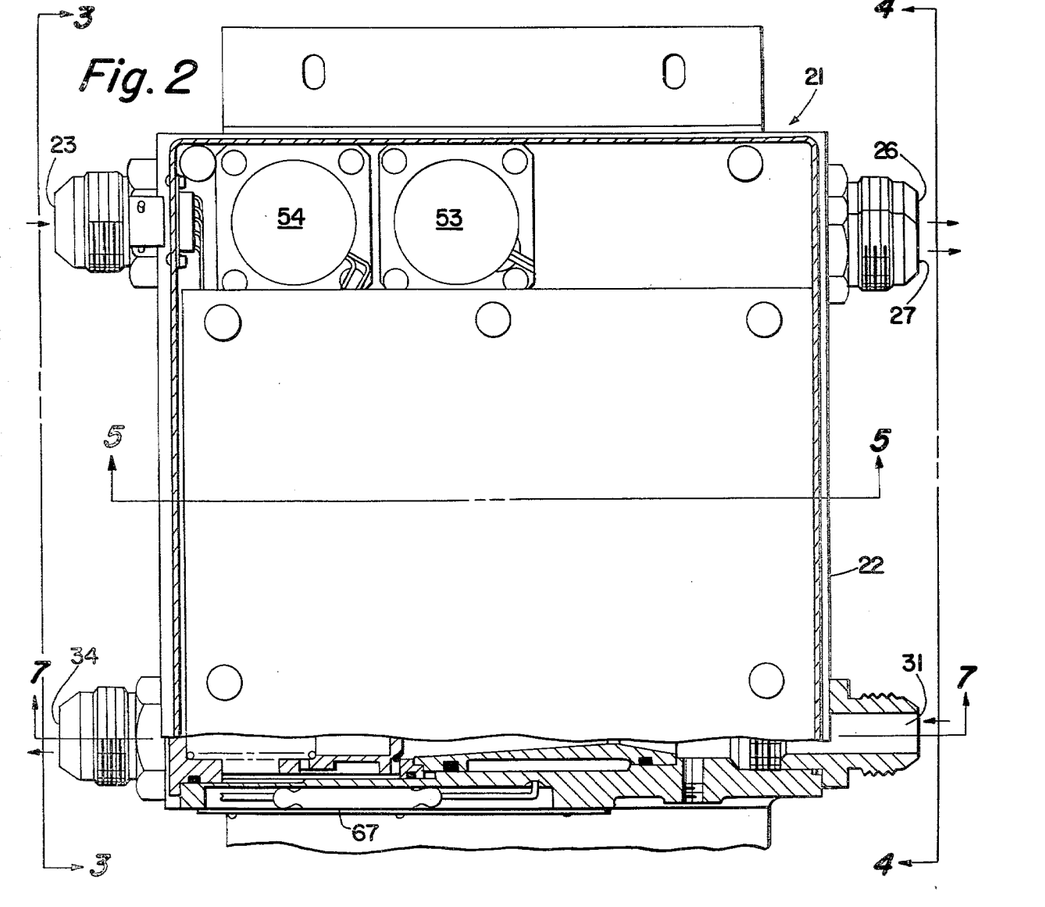
FIG. 2 is a section of a fluid flow control device which is made in accordance with the invention, as viewed from the line 2—2 of FIG. 3.
Figure 3:
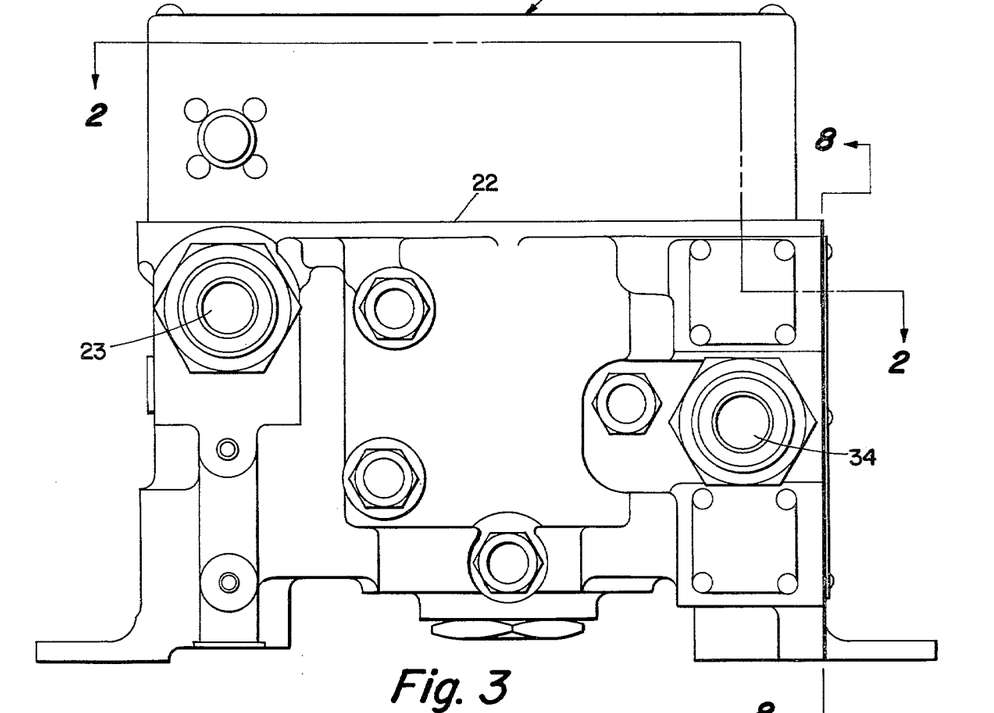
FIG. 3 is an end view of the device, as seen from the line 3—3 of FIG. 2.
Figure 4:
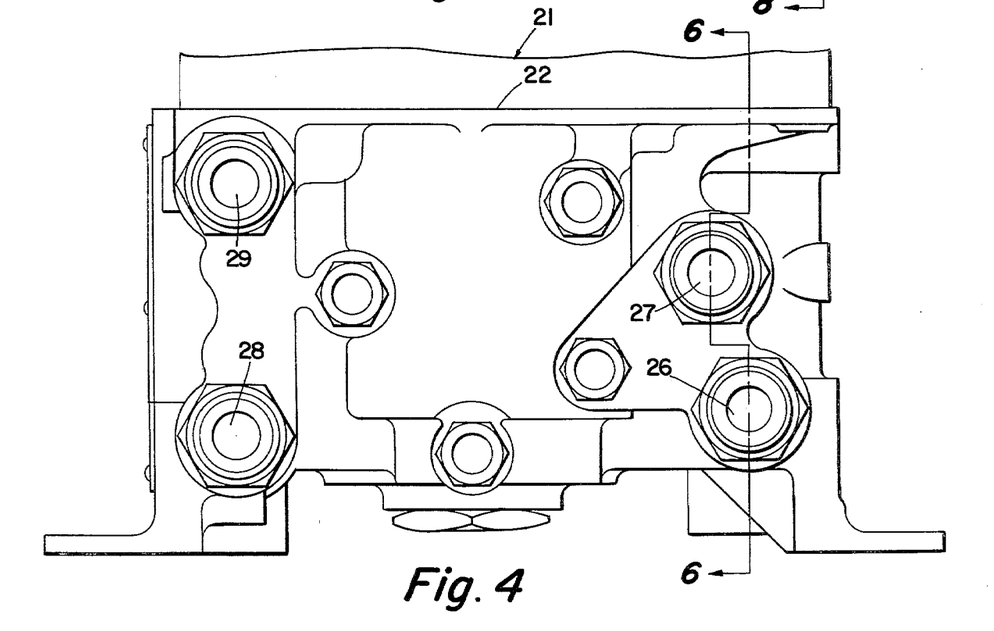
FIG. 4 is an opposing end view of the device, as seen from the line 4—4 of FIG. 2.

With reference to FIG. 1, there is shown a prior art mechanism 10 for monitoring the flow of fluid in a pair of conduits. Fluid flows into the mechanism 10 through an entrance port 11 where it is divided into two branches for circulation in essentially the same flow pattern through a pair of identically calibrated orifices 12 that are provided to create fluid pressure $P_a$, $P_b$ which are directed against confronting faces of a pair of similar, interconnected flexible diaphragm piston assemblies 13,14, that are associated with each of the orifices 12. The fluid is then discharged from the mechanism 10 into a pair of attached conduits for circulation where desired, after which the fluid is returned by the conduits and reenters the mechanism 10 through another similar porting arrangement. The two branches of fluid are directed through a second set of similarly calibrated orifices (not shown) prior to exiting from the mechanism. The fluid pressures $P_c$, $P_d$ created at the second set of orifices are directed against the remaining faces of the piston assemblies 13,14 in such a way as to maintain the assemblies, in balance, until a leak occurs to produce a variance in the fluid pressures. A pair of shutoff valves 15,16 for blocking the orifices 12, are secured to the piston assemblies 14 for unitary reciprocating movement. A pair of coil springs 17,18 are provided to stabilize the piston assemblies 13,14 in a neutral position where the shutoff valves 15,16 are maintained out of blocking relation with the orifices 12. A variance of the fluid pressures created by leakage of fluid in one of the conduits, causes movement of an associated piston assembly and attached shutoff valve necessary to block the flow of fluid into the ruptured conduit wherein leakage occurs. A pair of similar dampening devices 19,20 are coupled to each pair of connected piston assemblies 13,14 to dampen fluctuations of the assemblies caused by what might be termed false leakage signals or pressure differentials created, for example, when air enters the system, or during the start-up of the system by the operation of a pump necessary to circulate the fluid, under pressure, through the mechanism and attached conduits. It can be appreciated, however, that such fluctuations of the piston assemblies 13,14 caused by these false leakage signals can, in some instances, be severe enough to move one or both of the shutoff valves 15,16 sufficiently to block the orifices 12 and partially or completely shut down the system which could be more hazardous than the problem of leakage. Also, leakage of fluid in both conduits could cause the shutoff valves 15,16 to shut down the system.

DETAILED DESCRIPTION OF THE INVENTION

Figure 5:
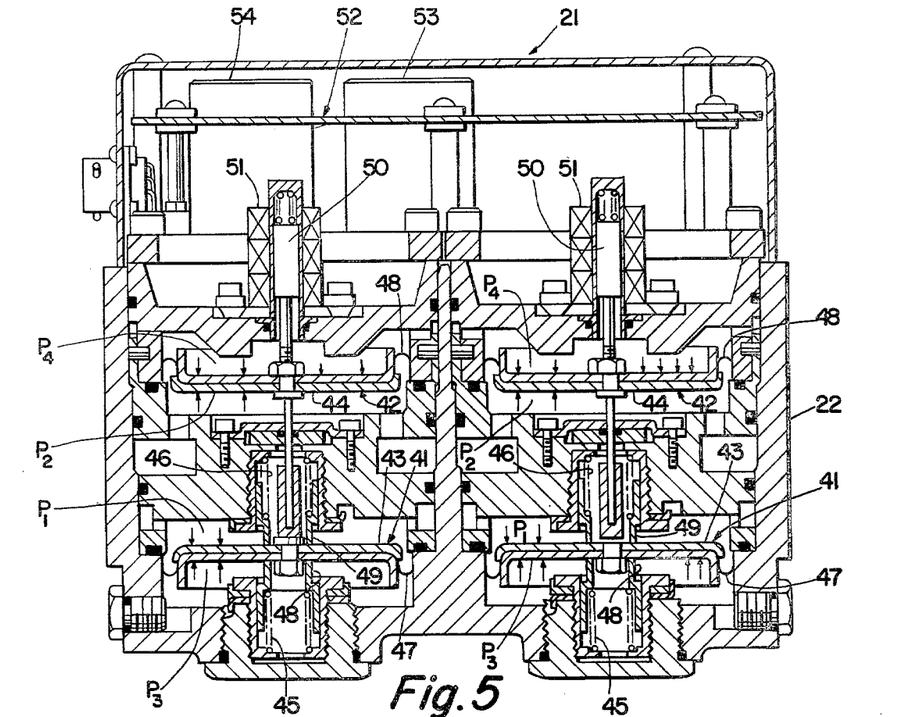
FIG. 5 is a section of the device, as viewed from the line 5—5 of FIG. 2.
Figure 6:
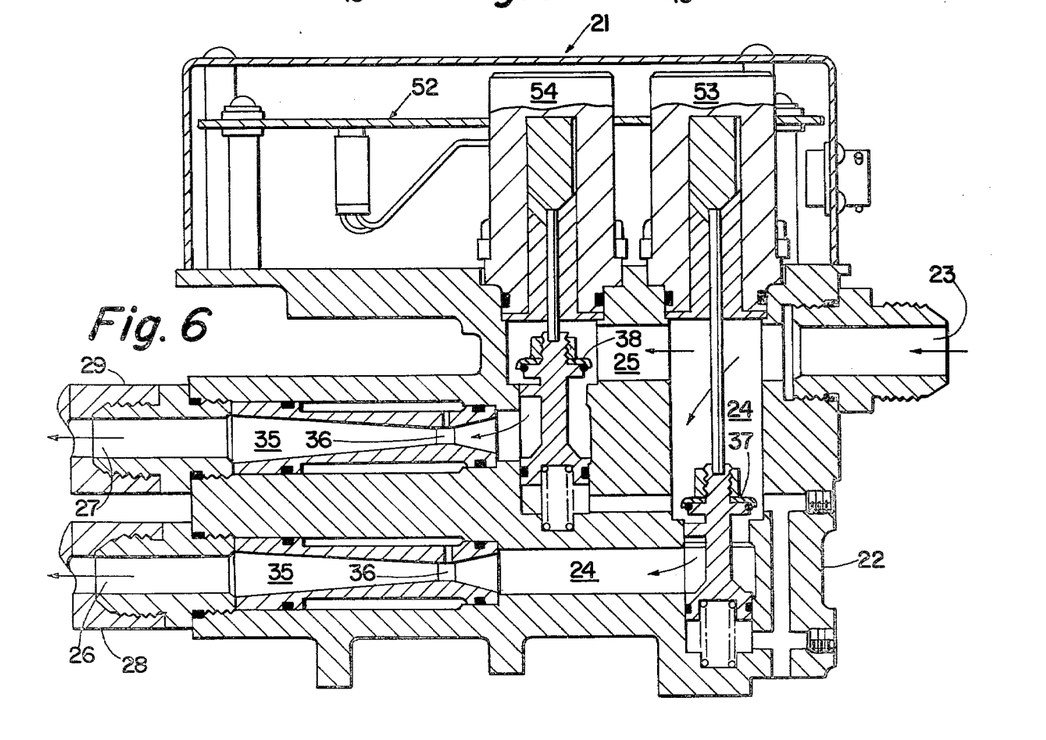
FIG. 6 is a section of the device, as viewed from the line 6—6 of FIG. 4.
Figure 7:
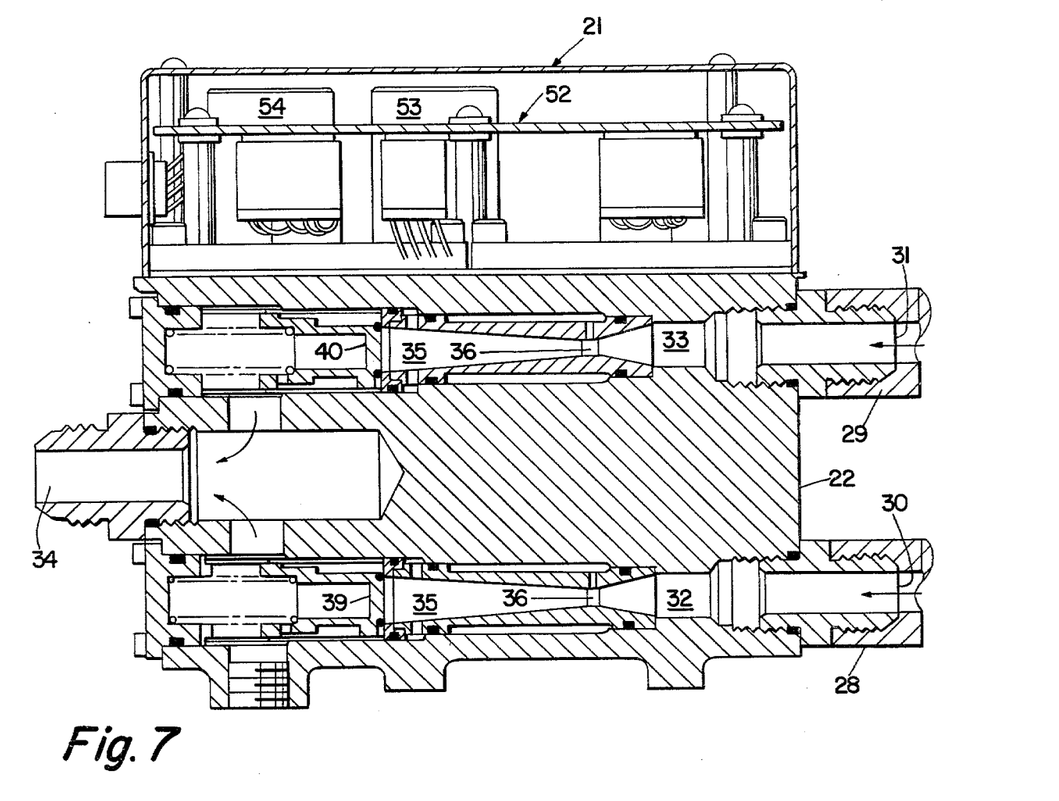
FIG. 7 is a section of the device, as viewed from the line 7—7 of FIG. 2.
Figure 8:
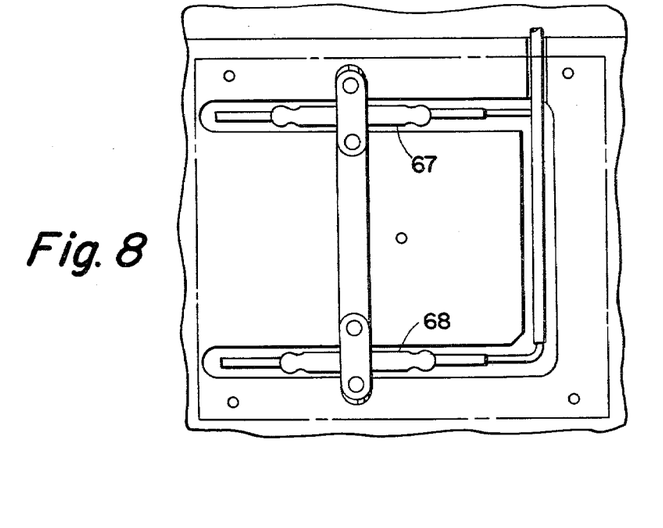
FIG. 8 is a portion of the section of the device, as viewed from the line 8—8 of FIG. 3.

With general reference to FIGS. 2—8 for like parts and particular reference to FIGS. 6,7, there is shown an improved fluid flow control monitoring device 21 which includes an outer housing 22; a fluid inlet 23 through which fluid initially enters the device 21; a pair of generally S-shaped inlet passageways 24,25 leading from the fluid inlet 23 for dividing the flow of fluid entering the fluid inlet 23 into two branches, the inlet passageways 24,25 terminating, respectively, at a pair of discharge ports 26,27 to which are attached a pair of fluid conduits 28,29 for carrying fluid, e.g. coolant, to areas of an aircraft requiring such fluid; a pair of reentry ports 30,31 to which opposing ends of the fluid conduits 28,29 are coupled so that fluid from said areas can be transported back to the device 21; a pair of generally Z-shaped outlet passageways 32,33 through which fluid travels back through the device 21; the outlet passageways 32,33 terminating at a fluid outlet 34 through which fluid finally exits the device 21.

Similar venturi sections 35 with calibrated orifices 36 are disposed in each one of the inlet passageways 24,25 and outlet passageways 32,33 for creating measurable fluid pressure differentials between fluid entering and leaving the calibrated orifices 36. The venturi sections 35, when compared to the regular restricted orifices of the prior art illustrated in FIG. 1, are more desirable since they lose less energy.

A pair of solenoid operated shutoff valves 37,38 are provided in the inlet passageways 24,25 between the fluid inlet 23 and the venturi sections 35 to block the flow of fluid from the device 21 into the fluid conduits 28,29. A pair of check valves 39,40 are used in the outlet passageways 32,33 between the fluid outlet 34 and the venturi sections 35 to prevent the backflow of fluid into the fluid conduits 28,29.

Broadly speaking, the device 21 is provided with four identical flow transducers which are designed to change the flow of fluid through the inlet and outlet passageways 24,25, 32,33 into electrical signals for convenient comparison with each other or a norm. Each of the flow transducers consists essentially of three major components; namely, a calibrated orifice to create fluid pressure differentials, a flexible elastomeric diaphragm/piston assembly which reacts to the fluid pressures created as fluid flows through the orifice, and an LVDT (linear variable differential transformer) electro mechanical transducer which is coupled to the assembly for changing linear movement of the assembly, caused by a variation in the fluid pressures, to an electrical signal. Each of the calibrated orifices is approximately 0.2 inch in diameter and designed to minimize the effects of viscosity changes.

More specifically, the device 21 is provided with a pair of diaphragm/piston-type assemblies 41,42 (FIG. 5) which are operatively connected to the calibrated orifices 36 of each pair of inlet and outlet passageways that are in communication via an interconnecting fluid conduit. Each pair of these piston assemblies 41,42, like the similar prior art piston assemblies 13,14 of FIG. 1, are coupled together, so that, (I) the fluid pressures $P_1$, $P_2$, created in each of the inlet passageways 24,25, act against confronting faces of the pistons 43,44 of the assemblies 41,42, and (II) the fluid pressures $P_3$, $P_4$, created in each of the outlet passageways 32,33 act against the remaining faces of the pistons of the assemblies 41,42 in such a way to maintain the piston assemblies 41,42 in a neutral position between extreme positions to which the piston assemblies can be moved by severe variations in fluid pressure. Fluid, under pressure, is circulated to the appropriate sides of the piston assemblies 41,42 from either side of each calibrated orifice 36 by means of drilled passages (not shown because of their small size and tortuous pathway within the housing 22) which are sized to minimize the effects of turbulent flow and low-order pressure fluctuations. A pair of springs 45,46 are associated with each of the piston assemblies 41,42 to counteract the differential fluid pressures exerted against the flexible diaphragms 47 of the assemblies, when the flow rate is nominal, so that the attached pistons 43,44 will be stabilized in their "neutral" positions. Actually, the springs 45,46 bias a pair of slidable hollow pins 48,49 to captive positions slightly spaced from each of the lowermost piston assemblies 41, when the assemblies 41,42 are in a neutral position. The pistons 43,44 are each formed of a lightweight material, e.g. aluminum, that serves as a support and guide for the flexible diaphagms 47 which are preferably constructed of a fabric reinforced fluorosilicone elastomer. The piston assemblies 41,42 reciprocate against the springs 45,46 in response to differences in fluid pressure created by positive leakage caused by actual rupturing of the fluid conduits, or negative leakage caused by the aforementioned temporary situations which appear to the system as leakage.

The pair of connected piston assemblies 41,42 are, in turn, coupled for unitary movement to the coil surrounded, metal core piece 50 of a common LVDT electro mechanical transducer 51 (FIG. 5). The displacement of the LVDT core pieces 50 is converted into an appropriate electrical signal. The LVDT electro mechanical transducers 51 eliminate the need for dynamic seals, thereby enhancing the reliability of the device 21, and are designed to measure very small changes in the position of the core pieces 50 caused by slight variations in the rate at which fluid flows through the calibrated orifices in the inlet and outlet passageways. An LVDT transducer 51 can be used in conjunction with each of the pair of piston assemblies 41,42. Such a system is simplified, however, by the arrangement of a common LVDT transducer 51 for each pair of piston assemblies 41,42. As best seen in FIG. 5, the output electrical signal of an LVDT transducer 51, normally operatively connected to one of the inlet passageways, can be arranged to counteract the output electrical signal from another LVDT transducer 51 that is normally operatively connected to the outlet passageway which is interconnected to the inlet passageway by means of the fluid conduit.

Any suitable electronic processor 52 is used to process the electrical signals transmitted to it from the pair of LVDT transducers 51 and actuates a pair of solenoids 53,54 to operate the shutoff valves 37,38 to block the flow of fluid into a conduit, wherein there is a variation in the flow of fluid entering and exiting the conduit. In this instance, the electronic processor 52, as best understood from FIG. 10, includes the following components.

Figure 10:
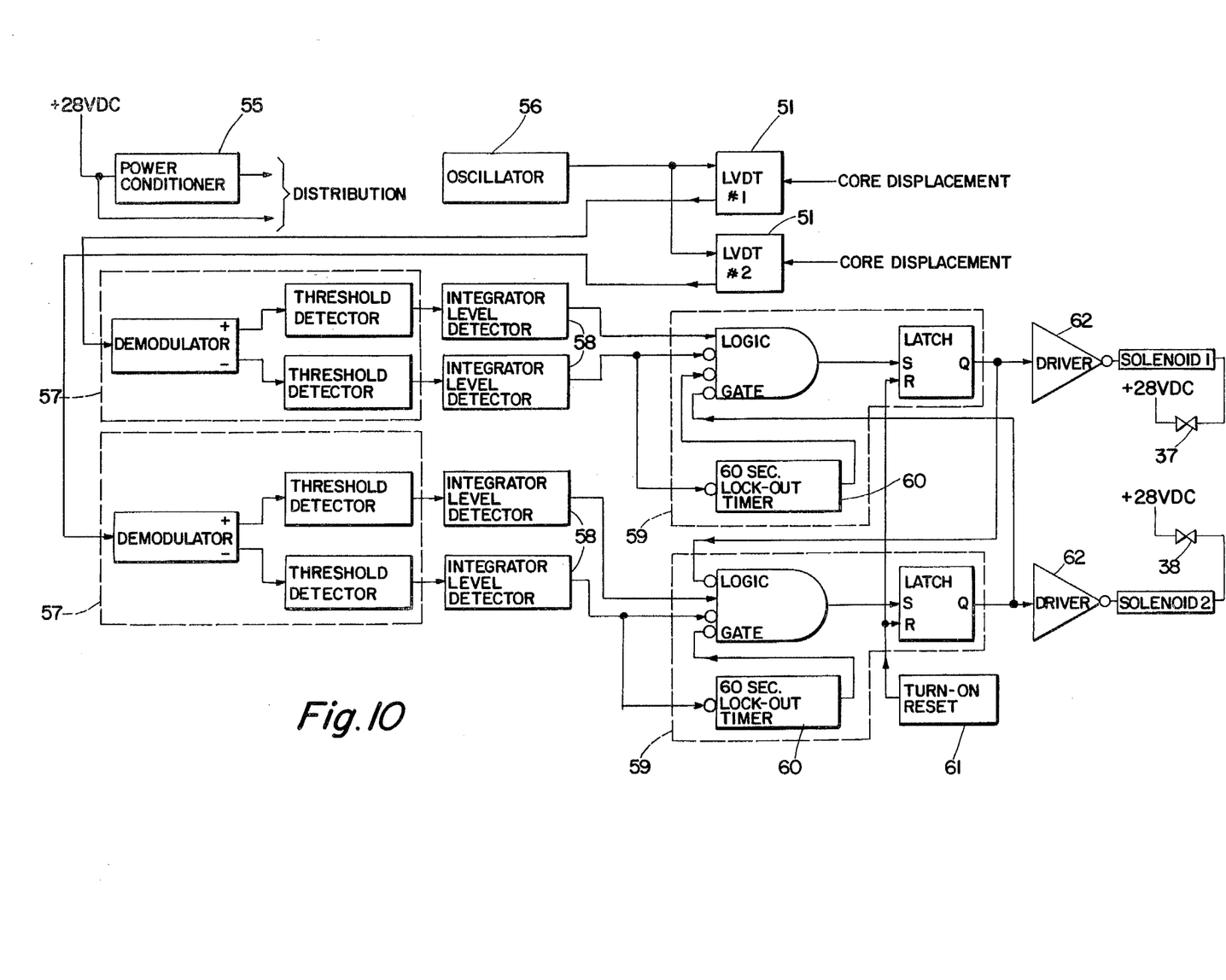
FIG. 10 is a block diagram of an electronic processor used in the invention.

Firstly, a power conditioner 55 to provide a regulated voltage supply, protection for input voltage transients, and power supply polarity reversal.

Secondly, an oscillator 56 to convert the regulated DC voltage to an amplitude stable, high frequency, trapazoidal wave form voltage that excites the primary windings of the LVDT transducers 51.

Thirdly, a plurality of demodulators 57 to rectify and filter the electrical signals received from the secondary windings of the LVDT transducers 51. Associated circuits amplify the demodulated signals to yield a transfer characteristic of 50 millivolts per 0.001 inch that the cores 50 of the LVDT transducers 51 travel. Also, signal conditioners are incorporated and their output signals, in turn, drive the threshold detectors. These detectors serve to compare the plus or minus core displacement signals from the null setting.

Fourthly, a plurality of integrators or positive timers 58 to monitor the core displacement signals to prevent spurious signals, usually of very short duration, from triggering closure of a solenoid, until the signal has stabilized for three seconds.

Fifthly, a plurality of output latch and logic devices 59 to energize a solenoid, if the positive displacement signal, resulting from a leakage occurrence, exceeds three seconds in duration. The solenoid in the alternate fluid path is prevented from being energized, even if that path should subsequently develop a leak. A solenoid, once energized to close a shutoff valve, remains energized even though the leak ceases. The devices 59 each include a sixty second negative timer 60 which is activated to inhibit the solenoid drive for sixty seconds, upon receipt of a negative displacement leak signal. Thus, any positive leak signal following a negative leak signal will be inhibited.

Sixthly, a turn-on and reset device 61 to prevent activation of the solenoid valves until sixty seconds after the pump is turned on to insure that all fluid paths and cavities are filled with fluid, otherwise, false plus and minus displacement signals may occur. Thus, such false signals are electronically ignored, until the fluid flow through the system has stabilized.

Lastly, a plurality of drivers 62 to provide the high power needed to energize the solenoids to operate the shutoff valves 37,38.

The electriconic processor 52 is designed so that only one of the shutoff valves 37,38 will be triggered even though leakage is sensed in both of the fluid conduits. Thus, fluid will continue to circulate through at least one of the fluid conduits to alleviate a complete shutdown of the system, since such a shutdown could create more hazardous problems than leakage. The device 21 is designed to block the flow of fluid in the fluid conduit in which leakage is first sensed. In cases where major leakage in one conduit and minor leaks in another are sensed almost simultaneously, the LVDT transducer 51, associated with the more severely ruptured conduit, will respond more rapidly in reporting the leakage of the electronic processors 52 which will act to shut off the flow of fluid in the more severely ruptured conduit even though leakage is first sensed in the conduit having minor leakage.

Figure 9:
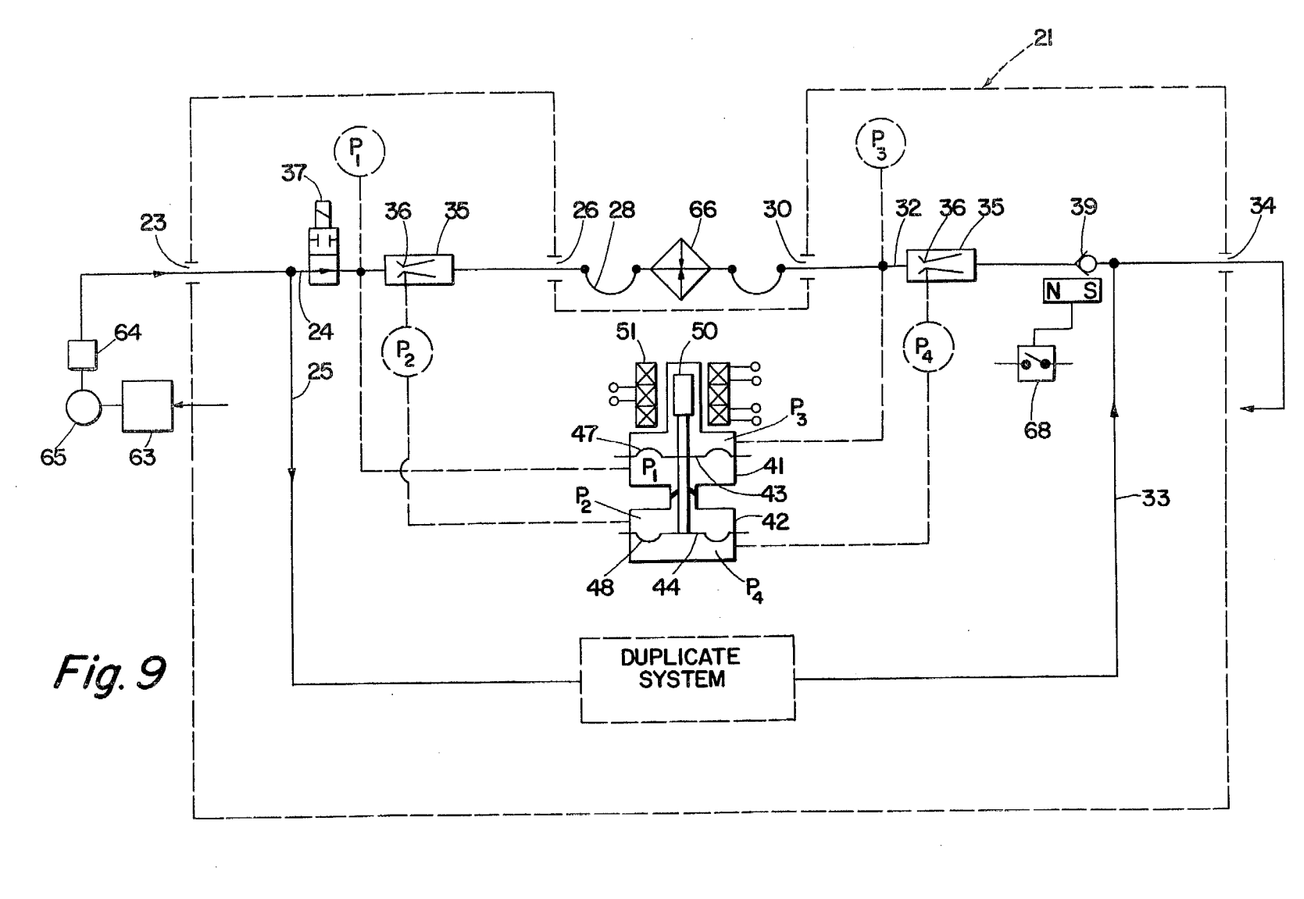
FIG. 9 is a schematic of a system which uses the device.

In operation, any suitable coolant, e.g. water or oil, is circulated, under pressure, from a reservoir 63 through a cooling unit 64 to the fluid flow control monitoring device 21 by means of a conventional pump 65. The coolant is divided within the device 21 into two branches which are directed into the fluid conduits 28,29 for circulation to a pair of transmitters 66 requiring the coolant to prevent overheating. Heated coolant from the transmitters 66 is returned to the device 21 via the reentry ports 30,31 after which the two branches of coolant are rejoined and forced to exit from the single fluid outlet 34 for return to the reservoir 63 for recirculation to the device 21 and transmitters 66.

The check valves 39,40 carry magnets for activating magnetic reed switches 67,68 (FIGS. 2,8) which are used to signal the control system and operator that insufficient fluid is flowing through the conduits and interconnected inlet and outlet passageways of the device.

The leakage of coolant from one of the fluid conduits 28,29, for example, causes a subsequent drop in the pressure of coolant flowing through the outlet passageway to which the leaking or ruptured conduit is coupled. This drop in fluid pressure will cause movement in one direction of the associated piston assemblies and attached core piece of the associated LVDT transducer which, in turn, causes a variation in the electrical signal being transmitted to the associated electronic processor which reacts immediately to start the positive timer 59 to delay, for a predetermined period of time, operation of the solenoid and shutoff valve necessary to block the flow of coolant to the ruptured conduit. If the variance in the electrical signal persists after the alloted time has lapsed, the electronic processor will actuate the solenoid to close the shutoff valve in the inlet passageway coupled to the ruptured conduit. If the variance in the electrical signal is caused by any one of the aforementioned temporary situations, e.g. trapped air, and not leakage of coolant from a ruptured conduit, the electronic processor will still react to start operation of the positive timer 59. Entrapped air first causes a change in fluid pressure within an inlet passageway and then a change in fluid pressure within the interconnected outlet passageway. Such changes causes the associated piston assemblies to fluctuate which, in turn, produces a change in the electrical signal previously reported to the electronic processor which reacts to operate the negative timer 60 and discontinue operation of the positive timer 59. These two timers 59,60 will continue to be alternately actuated as the signal vacillates until the trapped air escapes the device 21 and the changes in fluid pressure cease, thereby allowing the fluctuating piston assemblies to gradually return to their normal neutral positions. Thus, the continued alternate activation of the positive and negative timers 59,60 prevents actuation of a solenoid and shutoff valve to block the flow of coolant in the conduit experiencing entrapped air.

The electronic processor is also designed to actuate only one of the solenoids in cases where leakage is sensed in both of the conduits being serviced by the device. It can be appreciated that the timing of the device is such that the electronic processor will normally react to block the flow of coolant in the first conduit in which leakage is sensed, unless leakage in both conduits is almost simultaneous and leakage in the second conduit is sufficiently greater than leakage in the first conduit to cause more rapid movement of the associated piston assembly which, in turn, provokes a quicker response from the electronic processor, so that the flow of coolant will be blocked in the second conduit in which leakage is sensed.

Thus, there has been provided a fluid flow control device for sensing leakage of fluid from a fluid conduit which is one of a plurality of conduits being monitored by the device which is designed so that it will be aware of temporary situations which create false leakage signals, but will respond to block only actual leakage in a conduit. The device is designed to shut down only one of a pair of fluid conduits being monitored, in cases where leakage is sensed in both conduits, thereby maintaining some circulation of fluid rather than a complete shutdown of the system which could precipitate more hazardous problems than leakage.

What is claimed is:

1. A device for monitoring the flow of fluid in at least one pair of conduits attached thereto, and blocking the flow of fluid in at least one of the conduits when leakage of fluid occurs therein, comprising:
   (a) a housing;
   (b) a fluid inlet through which fluid from a source outside the housing, enters the housing;
   (c) a plurality of inlet passageways within the housing for receiving and dividing the flow of fluid entering the fluid inlet into branches, the inlet passageways terminating at a plurality of discharge ports to which fluid conduits are attachable for carrying fluid from the device;
   (d) a plurality of reentry ports to which fluid conduits are attachable and through which fluid carried by the fluid conduits is returned to the housing of the device;
   (e) an outlet passageway within the housing for each reentry port and communicating therewith for receiving fluid returning to the device, the outlet passageways terminating at a fluid outlet through which fluid exits the device, for example, to return to the source;
   (f) means associated with each of the inlet and outlet passageways for monitoring the flow of fluid therein and translating such flow into electrical signals; and
   (g) means responsive to the electrical signals for operating a shutoff valve to block the flow of fluid through an inlet passageway when there is a variance in the electrical signals from a norm, indicating leakage of fluid in a fluid conduit communicating with the blocked inlet passageway.

2. The device of claim 1, wherein the fluid flow monitoring means (f), includes:
   (I) a calibrated orifice in each of the passageways;
   (II) at least one flexible diaphragm/piston assembly associated with each of the calibrated orifices and movable in response to a change in pressure of fluid entering and exiting an associated orifice; and
   (III) means for translating movement of the assemblies into electrical signals which are transmitted to the valve operating means (g).

3. The device of claim 2, wherein the calibrated orifice is formed within a venturi section in each of the passageways.

4. The device of claim 3, wherein the translating means (III) includes an LVDT transducer having coils surrounding a metal core piece which is coupled to at least one of a pair of assemblies for unitary movement therewith.

5. The device of claim 2, wherein the valve operating means (g), includes an electronic processor in electrical communication with the translating means (III), the electronic processor comprising:
   (IV) means for delaying operation of a shutoff valve for a period of time sufficient to indicate that a variation of the electrical signals is caused by leakage of fluid from a conduit.

6. The device of claim 5, wherein the electronic processor further comprises:
   (V) means for converting direct electrical current into alternating electrical current;
   (VI) means for regulating the voltage for use as a norm; and
   (VII) means for comparing the electrical signals from the translating means (III) with the regulated voltage norm to detect variations thereof.

7. The device of claim 1, in combination with:
   (h) a source of liquid coolant fluid;
   (i) a fluid conduit connected between each discharge port and a reentry port for carrying coolant to and from a location where it is needed such as to and from a transmitter on an aircraft;
   (j) means for circulating liquid coolant, under pressure, from the source to the fluid inlet for successive passage through the inlet passageways, fluid conduits, and outlet passageways; and
   (k) means for returning liquid coolant, under pressure, to the source from the outlet passageways.

8. A device for monitoring the flow of fluid in at least one pair of conduits attached thereto, and blocking the flow of fluid in at least one of the conduits when leakage of fluid occurs therein, comprising:
   (a) a housing having a fluid inlet in spaced relation from a pair of discharge ports and a fluid outlet in spaced relation from a pair of reentry ports;
   (b) a pair of fluid inlet passageways connecting the fluid inlet and the pair of discharge ports for dividing the flow of fluid entering the fluid inlet into two branches, each of the inlet passageways having a calibrated orifice in the form of a venturi section adjacent the discharge ports;
   (c) a shutoff valve in each of the inlet passageways between the fluid inlet and venturi sections for blocking the flow of fluid through the discharge ports, when the valves are moved from open to closed positions;

(d) a solenoid associated with each of the shutoff valves for moving the valves between open and closed positions;

(e) a pair of fluid outlet passageways connecting the reentry ports and the fluid outlet, each of the outlet passageways having a calibrated orifice in the form of a venturi section adjacent the reentry ports;

(f) a check valve in each of the outlet passageways between the reentry ports and venturi sections for preventing the backflow of fluid through the reentry ports, when the valves are moved from open to closed positions;

(g) a pair of flexible diaphragm/piston assemblies disposed within the housing and associated with the venturi sections of an inlet passageway and an associated outlet passageway through which the same branch of fluid passes, each pair of assemblies being movable linearly in response to variations in fluid pressures exerted thereagainst and created by the flow of fluid through the venturi sections, each pair of assemblies including spring means for biasing the assemblies in a neutral linear position between extreme positions which the assemblies can be moved to by a disruption in the flow of fluid through the passageways;

(h) a metal core piece of an LVDT transducer coupled to each pair of assemblies for unitary linear movement therewith, the transducers translating linear movement of their core pieces to electrical signals which are transmitted therefrom, the electrical signals being voltage signals;

(i) an electronic processor for receiving the electrical signals transmitted from the LVDT transducers, the processor including:

(I) means for converting direct electrical current to alternating electrical current;

(II) means for regulating the voltage from a power source to produce a voltage norm at which the device operates;

(III) means for comparing the voltage signals from the LVDT transducers to the voltage norm and actuating a solenoid to cause movement of a shutoff valve to a closed position in the inlet passageway containing the valve, when there is a variation in a signal from the norm, caused by a change in fluid pressure in the outlet passageway associated with the inlet passageway and shutoff valve, sufficient to motivate the processor to actuate the solenoid; and (IV) means for delaying actuation of a solenoid until it is determined that the variation in signal from the LVDT transducer from the norm is caused by leakage of fluid in a conduit.

9. The device of claim 8, wherein the means for delaying actuation of a solenoid; includes:

(V) a pair of timers which are alternately actuated when linear movement of a pair of assemblies fluctuates in response to successive changes in fluid pressure in an inlet passageway and an outlet passageway associated therewith.

10. The device of claim 9, which includes:

(j) means associated with at least one of the check valves and operated by movement thereby to make known when fluid is not flowing in an outlet passageway including the check valve.

11. The device of claim 10, wherein the spring means includes a pair of axially spaced springs which bias a pair of retainer pins into captive positions where the pins are closely spaced from one of the assemblies of each pair of assemblies.

12. The device of claim 10, wherein the inlet passages are generally S-shaped between the fluid inlet and discharge ports when the device is in a normally horizontal position, and the outlet passageways are generally Z-shaped between the reentry ports and fluid outlet.

13. The device of claim 10, in combination with:

(k) a source of liquid coolant fluid;

(l) a fluid conduit connected between each discharge port and a reentry port for carrying coolant to and from a location where it is needed such as to and from a transmitter on an aircraft;

(m) means for circulating liquid coolant, under pressure, from the source to the fluid inlet for successive passage through the inlet passageways, fluid conduits, and outlet passageways; and (n) means for returning liquid coolant, under pressure, to the source from the outlet passageways.

* * * * *